US 6,580,460 B1

(12) United States Patent
Takahashi et al.

(10) Patent No.: US 6,580,460 B1
(45) Date of Patent: Jun. 17, 2003

(54) SYSTEM CONNECTING POWER SUPPLY LINE TO IMAGE SENSING DEVICE UPON DATA TRANSPORT

(75) Inventors: Kenji Takahashi, Kawasaki (JP); Hisashi Ishikawa, Yokohama (JP); Hiroshi Tajika, Yokohama (JP); Miyuki Fujita, Tokyo (JP); Yuji Konno, Kawasaki (JP); Hirowo Inoue, Kawasaki (JP); Norihiro Kawatoko, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/030,767

(22) Filed: Feb. 26, 1998

(30) Foreign Application Priority Data

Feb. 28, 1997  (JP) .............................................. 9-046637

(51) Int. Cl.[7] .............................................. H04N 5/225
(52) U.S. Cl. ...................................... 348/372; 348/373
(58) Field of Search ................................. 348/372, 373, 348/374, 375, 376; 396/301, 302, 303

(56) References Cited

U.S. PATENT DOCUMENTS

| 4,928,137 A | * | 5/1990 | Kinoshita | 348/372 |
| 4,961,220 A | * | 10/1990 | Tentler et al. | 379/413 |
| 5,210,568 A | * | 5/1993 | Miyake et al. | 348/372 |
| 5,313,305 A | * | 5/1994 | Harigaya et al. | 348/372 |
| 5,493,685 A | * | 2/1996 | Zenda | 714/340 |
| 5,784,105 A | * | 7/1998 | Kawamura | 348/372 |
| 5,875,313 A | * | 2/1999 | Sescila, III et al. | 395/309 |
| 6,191,814 B1 | * | 2/2001 | Elberbaum | 348/212 |

FOREIGN PATENT DOCUMENTS

| EP | 0 754 994 | 1/1997 |
| JP | 62-266982 | 11/1987 |
| JP | 6-334952 | 12/1994 |
| JP | 6-351012 | 12/1994 |
| JP | 7-072958 | 3/1995 |
| JP | 7-284043 | 10/1995 |
| JP | 9-294108 | 11/1997 |

* cited by examiner

Primary Examiner—Wendy R. Garber
Assistant Examiner—Rashawn N. Tillery
(74) Attorney, Agent, or Firm—Fitzpatrick, Cella, Harper & Scinto

(57) ABSTRACT

According to the invention, a power supply for an image sensing device is obtained from a printer to prevent consumption of the battery. When the image sensing device is connected to the printer, a power management unit checks if electric power can be supplied from the printer. When electric power can be supplied from the printer, the power management unit switches the power supply from the battery to a power supply receiving/supplying unit that receives electric power from the printer. In this case, if the remaining capacity on the battery is small, the battery is charged by electric power from the printer. Also, the luminance of a display unit is increased, or the operation frequency of a control unit is raised. On the other hand, when electric power cannot be supplied from the printer, the power management unit switches the power supply to the battery. In this case, the power management unit reduces consumption power by decreasing the luminance of the display unit or reducing the operation frequency of the control unit.

18 Claims, 18 Drawing Sheets

BRANCH: NODE HAVING TWO OR MORE NODE CONNECTIONS
LEAF: NODE HAVING ONLY ONE NODE CONNECTION
□ : PORT
c : PORT CORRESPONDING TO CHILD NODE
p : PORT CORRESPONDING TO PARENT NODE

BUS ACCESS REQUEST

BUS ACCESS GRANT

SYSTEM CONNECTING POWER SUPPLY LINE TO IMAGE SENSING DEVICE UPON DATA TRANSPORT

SUMMARY OF THE INVENTION

1. Field of the Invention

The present invention relates to an image input device which can be directly connected to an image output device without any intervention of a printer server such as a personal computer and its control method, and an image input/output system.

2. Related Background Art

Along with the spread of digital image sensing devices such as digital cameras, digital video cameras, and the like, techniques that can facilitate handling of digital image sensing devices have been developed. As one of these techniques, a direct connection between a digital image sensing device and a printer is known. With this technique, an image sensed by a digital image sensing device can be directly printed by a printer without intervention of any personal computer or the like. For this reason, the direct connection between the digital image sensing device and printer promotes use of digital cameras by users who have no personal computers.

A connection between a digital image sensing device and personal computer or a connection between the digital image sensing device and printer upon direct printing is realized by one of wireless and wired methods. Both of the methods consume much of the battery of the digital image sensing device to transfer data from the digital image sensing device, to check an image on a viewfinder of the digital image sensing device, and so on. That is, upon data transfer to a personal computer or direct printing, the user must connect two cables, i.e., a cable for data transfer and an AC adapter for supplying electric power to the camera.

SUMMARY OF THE INVENTION

The present invention has been made in consideration of the above-mentioned prior art, and has as its object to obviate the need for connecting a power supply line to a digital image sensing device upon data transport and to prevent battery consumption or short battery during the transport.

In order to achieve the above object, the present invention comprises the following arrangement.

That is, there is provided an image input/output system built by connecting an image output device and an image input device, the image output device outputting an image signal received from the image input device, and supplying electric power to the image input device, and the image input device being connected to the image output device via a connection cable to transmit image data to the image output device and to receive the electric power supplied from the image output device, and having a power supply unit, and a power supply control unit for determining whether to receive the electric power from the image output device, for, when it is determined that the image input device can receive the electric power from the image output device, using the electric power from the image output device, and for, when it is determined that the image input device cannot receive the electric power from the image output device, using electric power from the power supply unit.

There is also provided an image input device comprising:

connection means connected to an external apparatus which exchanges data with a connected device, and can supply electric power to the device;

a power supply unit; and a power supply control unit for checking if electric power can be received from the external device, for, when it is determined that the electric power can be received from the external device, using the electric power from the external device, and for, when it is determined that the electric power cannot be received from the external device, using electric power from the power supply unit.

Furthermore, there is provided a method of controlling an image input device, which has a power supply unit, is connected to an external device, and is driven by electric power supplied from one of the external device and the power supply unit, comprising:

a determination step of checking if electric power can be received from the external device; and a power supply control step of using the electric power from the external device when it is determined that the electric power can be received from the external device, and using electric power from the power supply unit when it is determined that the electric power cannot be received from the external device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

<Arrangement of Digital Image Input/Output System>

Figure 1:
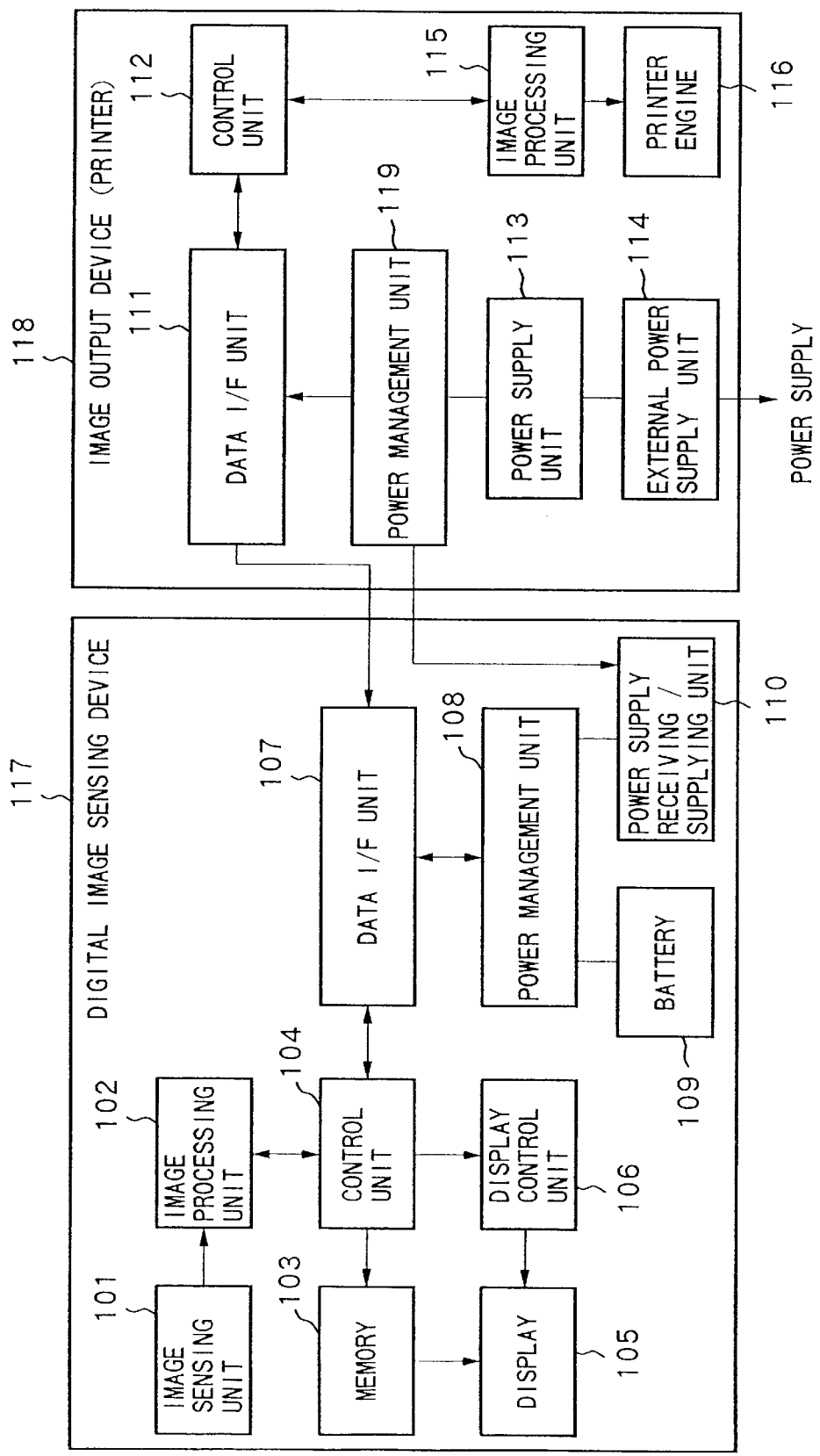
FIG. 1 is a block diagram of an image input/output system.

FIG. 1 is a block diagram of an image input/output system which is built by connecting a digital image sensing device 117 such as a digital camera or the like serving as an image input device, and an image output device 118 such as a printer or the like via an interface such as an IEEE1394 serial bus. The present invention will be described hereinafter with reference to this block diagram. This embodiment will exemplify a case wherein the digital image sensing device and printer are directly connected to each other, and the digital image sensing device can receive electric power from the printer.

In FIG. 1, the image sensing device 117 obtains a sensed image signal by a CCD in an image sensing unit 101. The sensed image signal is subjected to color image processing such as color conversion, filter processing, and the like in an image processing unit 102, and is converted into image data. A control unit 104 controls a display control unit 106 to display the image data on a display 105, and stores the image data in a memory 103.

The control unit 104 controls a power management unit 108 on the basis of information sent from the printer 118 via a data I/F unit 107. In this case, a recognition signal of a printer, a signal indicating enable/disable of power supply via a connected cable, status of the output device, and the like are received from the printer 118.

Figure 2:
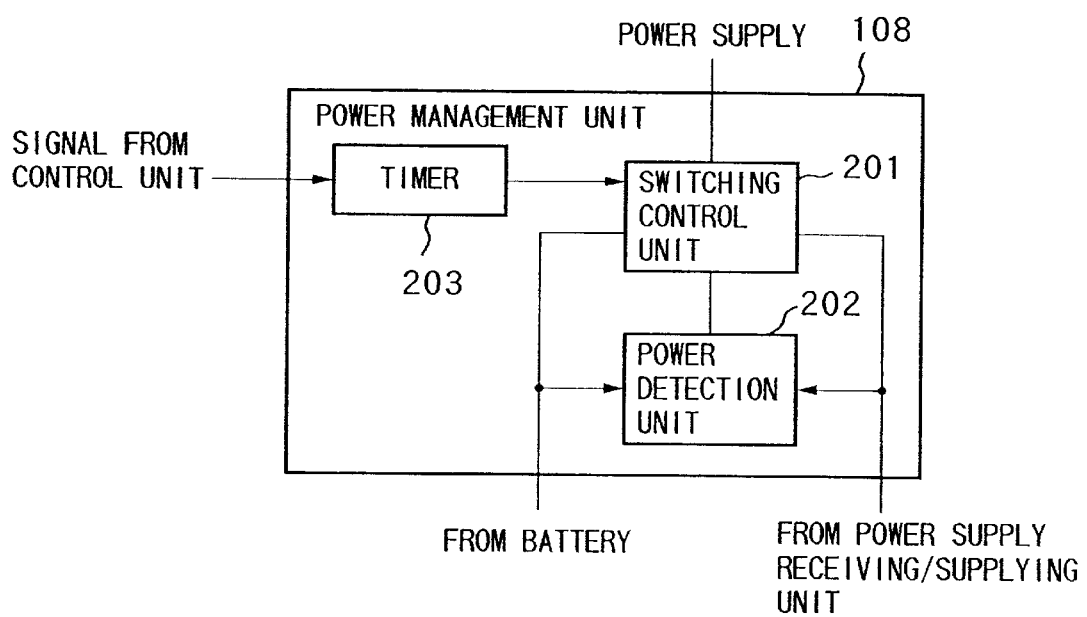
FIG. 2 is a block diagram of a power management unit.

FIG. 2 shows the arrangement of the power management unit 108. A power detection unit 202 measures the power supply capacity supplied from the printer 118, and detects whether to obtain the power supply capacity required for operating the image sensing device 117. When it is confirmed that the power supply capacity from the printer 118 detected by the power detection unit 202 is large enough to operate the digital image sensing device 117, the power supply of the digital image sensing device 117 is switched from a battery 109 to that of the printer 118 obtained via a power supply receiving/supplying unit 110. Also, the power management unit 108 detects the remaining charge on the battery 109. When the remaining charge is small, the power management unit 108 supplies electric power from the power supply receiving/supplying unit 110 to the battery 109 by a switching control unit 201 so as to charge the battery 109.

When image data sensed by the image sensing device 117 is to be printed out, the image data is sent to a data I/F unit 111 of the printer 118, and is subjected to processing such as table conversion, RGB→CMYK conversion, binarization, and the like in an image processing unit 115. The processed data is sent to a printer engine 116, and is printed out.

The digital image sensing device 117 is connected to the printer 118 via a two-way interface to recognize that it is connected to the printer 118 and to determine the power supply capacity supplied from the printer. As an example of the two-way interface for this purpose, the IEEE1394 standards used in the system of this embodiment will be explained below.

<Outline of IEEE1394 Technology>

With the advent of home digital VTRs and DVDs, real-time, large-volume data transfer of, e.g., video data, audio data, and the like need be supported. In order to transfer such video data and audio data in real time to a personal computer (PC) or to another digital device, an interface that has required transfer functions and can realize high-speed data transfer is required. The interface developed to this end is the IEEE1394-1995 (High Performance Serial Bus) (to be referred to as a 1394 serial bus hereinafter).

Figure 5:
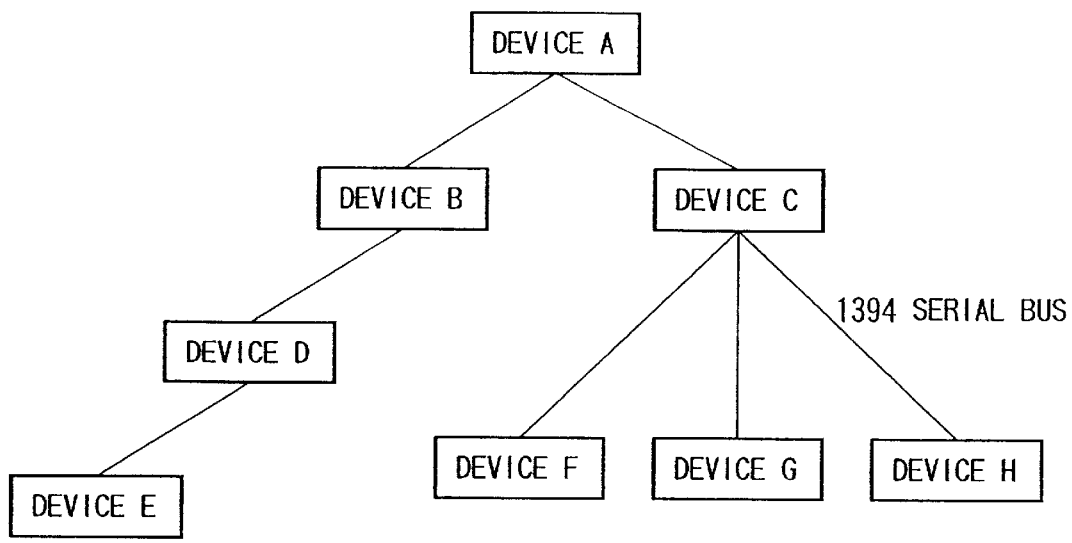
FIG. 5 is a diagram showing an example of a network system built using a 1394 serial bus.

FIG. 5 shows an example of a network system built using the 1394 serial bus. This system comprises devices A, B, C, D, E, F, G, and H, and devices A and B, A and C, B and D, D and E, C and F, C and G, and C and H are connected to each other via 1394 serial bus twisted pair cables. These devices A to H are, for example, a PC, digital VTR, DVD, digital camera, hard disk, monitor, and the like.

The connection methods between adjacent devices include both the daisy chain method and node branch method, and connections with a high degree of freedom can be realized.

The individual devices have their own unique IDs, and recognize each other to build a single network within the range connected via the 1394 serial bus. By sequentially connecting adjacent digital devices via a single 1394 serial bus cable, each device serves as a repeater, and constitutes a single network as a whole. Also, the 1394 serial bus has a plug-and-play function as its characteristic feature, and when a cable is connected to each device, the device itself and its connection state can be automatically recognized.

In the system shown in FIG. 5, when a certain device is removed from the network or a new device is added to the network, bus reset is automatically done to reset the network configuration used so far and to rebuild a new network. With this function, the network configuration can always be set and recognized.

The 1394 serial bus has a data transfer rate of 100/200/400 Mbps, and a device having a higher transfer rate supports the transfer rate of neighboring devices and attains compatibility.

Data transfer modes include an asynchronous transfer mode for transferring asynchronous data (to be referred to as Async data hereinafter) such as a control signal and the like, and an isochronous transfer mode for transferring isochronous data (to be referred to as Iso data hereinafter) such as real-time video data, audio data, and the like. Both the Async data and Iso data are transferred in each cycle (normally, 1 cycle=125 $\mu$s) following a cycle start packet (CSP) that indicates the start of a cycle, while giving priority to Iso data transfer.

Figure 6:
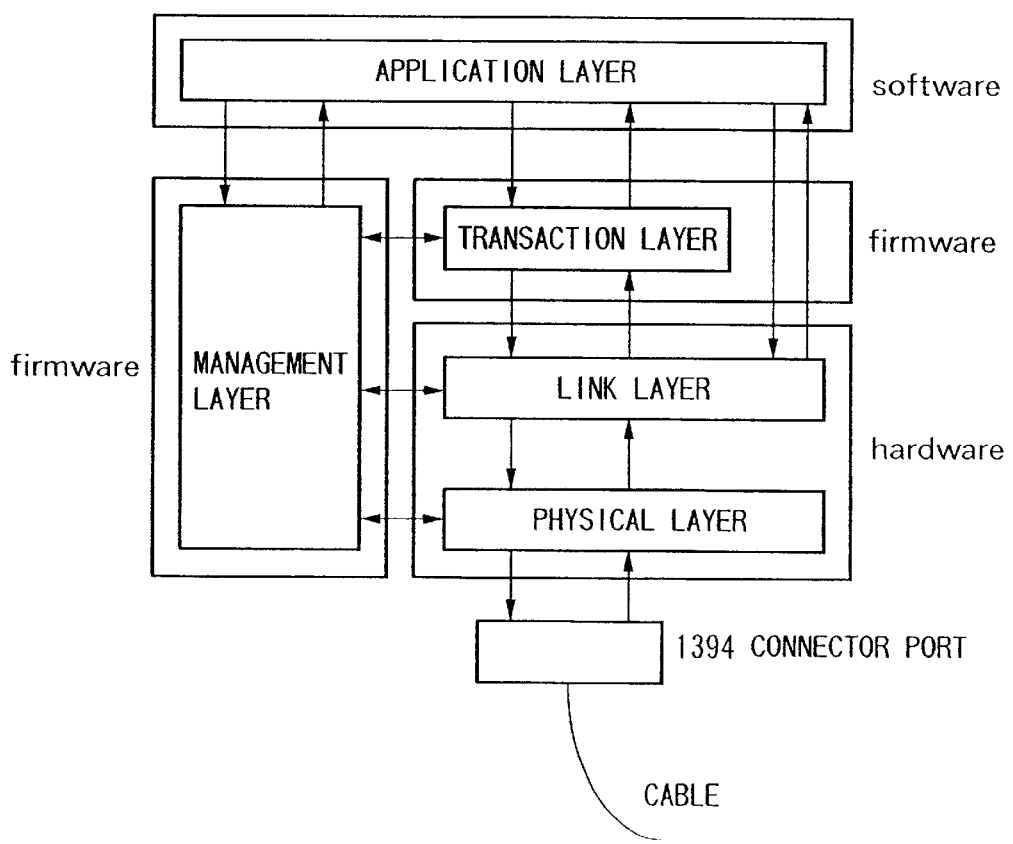
FIG. 6 shows the elements of the 1394 serial bus.

FIG. 6 shows the elements of the 1394 serial bus.

The 1394 serial bus has a layer (hierarchical) structure as a whole. As shown in FIG. 6, the cable of the 1394 serial bus is the lowest hardware layer, the connector of the cable is connected to a connector port, and hardware above the connector port includes the physical layer and link layer.

The hardware is an actual interface chip. Of the hardware, the physical layer performs coding and connector control and the like, and the link layer performs packet transfer and cycle time control and the like.

A transaction layer in firmware manages data to be transferred (transaction), and issues commands such as Read, Write, and the like. A management layer manages the connection states and IDs of the devices connected, i.e., manages the network configuration.

These hardware and firmware entities essentially make up the 1394 serial bus.

The application layer in software differs depending on the software used, and defines how to interface data. The application layer is defined by a protocol such as an AV protocol.

The architecture of the 1394 serial bus has been described.

Figure 7:
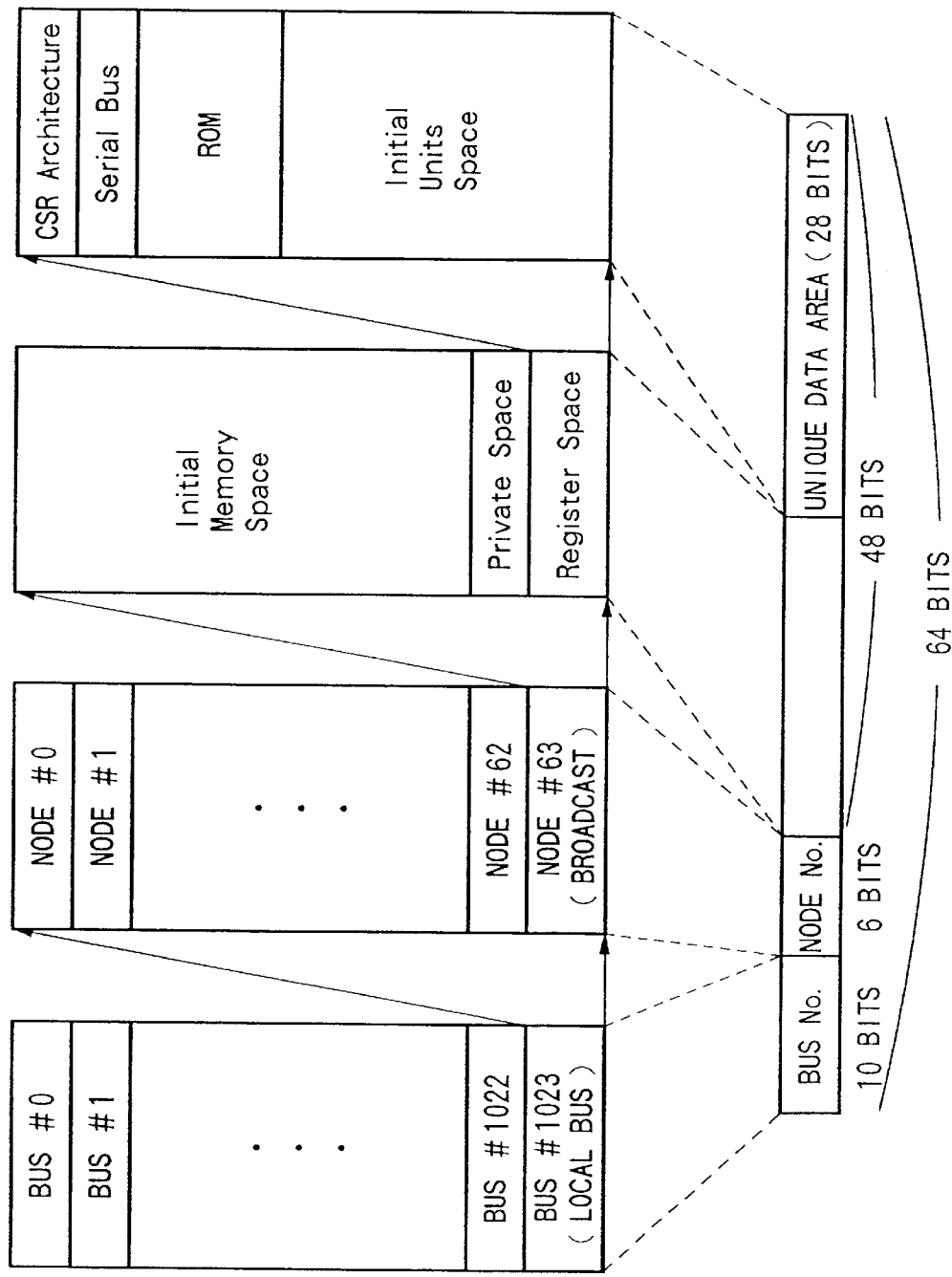
FIG. 7 shows the address space in the 1394 serial bus.

FIG. 7 shows the address space in the 1394 serial bus.

Each device (node) connected to the 1394 serial bus must have a unique 64-bit address. By storing this address in a ROM, the sender and receiver addresses in each communication can always be recognized, and a communication with the designated receiver can be made.

The 1394 address bus is addressed by a method complying with the IEEE1212 standards. Upon setting an address, first 10 bits are used to designate the bus number and the subsequent 6 bits are used to designate the node ID number. The remaining 48 bits are an address width given to each device, and can be used as a unique address space. The last 28 bits store information for identifying each device, designating use conditions, and so on as a unique data area.

The outline of the 1394 serial bus technology has been described.

The characteristic technique portion of the 1394 serial bus will be described in more detail below.

<Electrical Specifications of 1394 Serial Bus>

Figure 8:
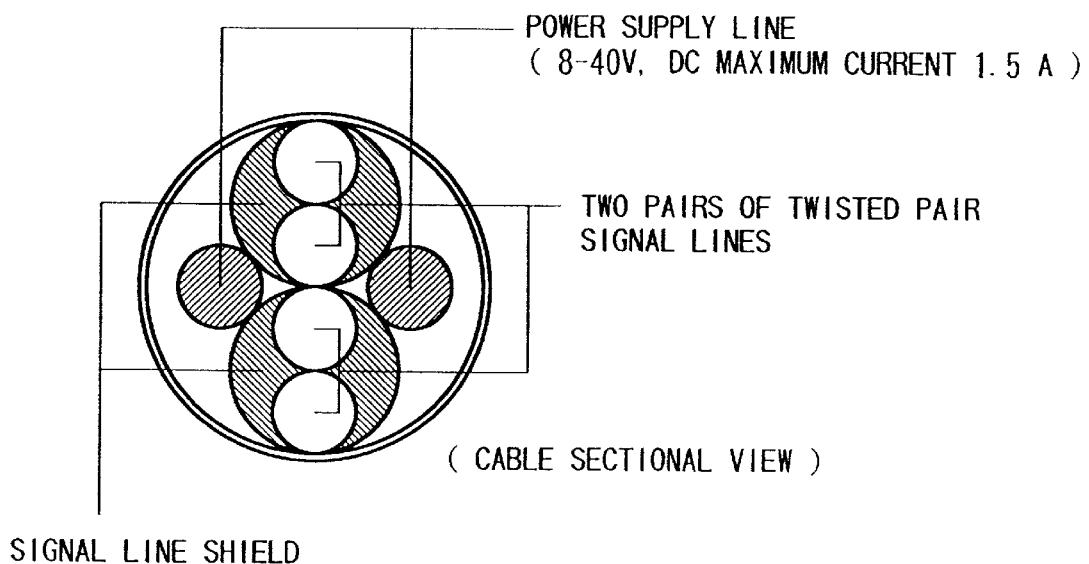
FIG. 8 is a sectional view of a 1394 serial bus cable.

FIG. 8 is a sectional view of the 1394 serial bus cable.

In the 1394 serial bus, the connection cable includes a power supply line in addition to two pairs of twisted pair signal lines. With this configuration, electric power can be supplied to a device without any power supply, a device that suffers voltage drop due to failure, and the like.

The prescribed power supply voltage in the power supply line ranges from 8 to 40 V, and the prescribed maximum current is DC 1.5 A.

<DS-Link Coding>

Figure 9:
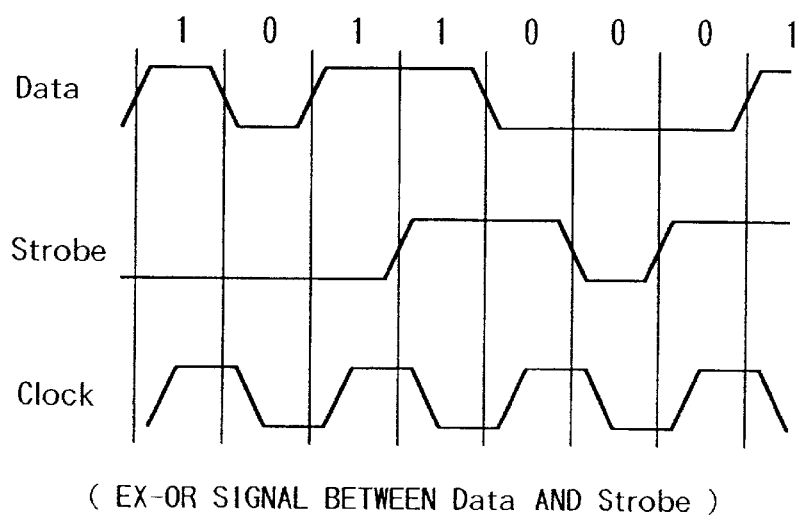
FIG. 9 is a chart for explaining DS-Link coding of the data transfer format adopted in the 1394 serial bus.

FIG. 9 is a chart for explaining DS-Link coding of the data transfer format adopted in the 1394 serial bus.

The 1394 serial bus adopts DS-Link (Data/Strobe Link) coding. The DS-Link coding is suitable for high-speed serial communications, and requires two signal lines. That is, one of a twisted pair line sends actual data, and the other sends a strobe signal.

The receiver side can reproduce clocks by exclusively ORing the received data and strobe signal.

As the merits of the DS-Link coding, higher transfer efficiency can be assured as compared to other serial data transfer methods, and the circuit scale of a controller LSI can be reduced since no PLL circuit is required. Also, since no information indicating an idle state need be sent if there is no data to be transferred, power savings can be attained by setting the transceiver circuits of the individual devices in a sleep state, and so on.

<Bus Reset Sequence>

In the 1394 serial bus, node IDs are assigned to the individual devices (nodes) connected to recognize them as the network configuration.

When the network configuration has changed, for example, when changes have taken place due to insertion/removal of a node or an increase/decrease in the number of nodes due to ON/OFF of their power switches, and a new network configuration need be recognized, each node that has detected the changes transmits a bus reset signal onto the bus to start a mode for recognizing the new network configuration. The change detection method at that time is attained by detecting changes in bias voltage on the 1394 port board.

Upon receiving a bus reset signal transmitted from a certain node, the physical layer of each node informs the link layer of generation of bus reset simultaneously with the reception, and transmits a bus reset signal to another node. After all the nodes have detected the bus reset signal, the bus reset sequence is started.

The bus reset sequence is started by hardware detection of, e.g., insertion/disinsertion of cables, network abnormality, and the like, and is also started by a command directly issued to the physical layer by, e.g., host control from the protocol.

Once the bus reset sequence has been started, data transfer is temporarily interrupted until completion of the sequence, and upon completion of the sequence, the data transfer is restarted in the new network configuration.

The bus reset sequence has been described.

<Node ID Determination Sequence>

After the bus reset sequence, each node starts to assign an ID to the individual nodes so as to build a new network configuration. A general sequence from the bus reset until node ID determination will be explained below with reference to the flow charts in FIGS. 17, 18, and 19.

Figure 17:
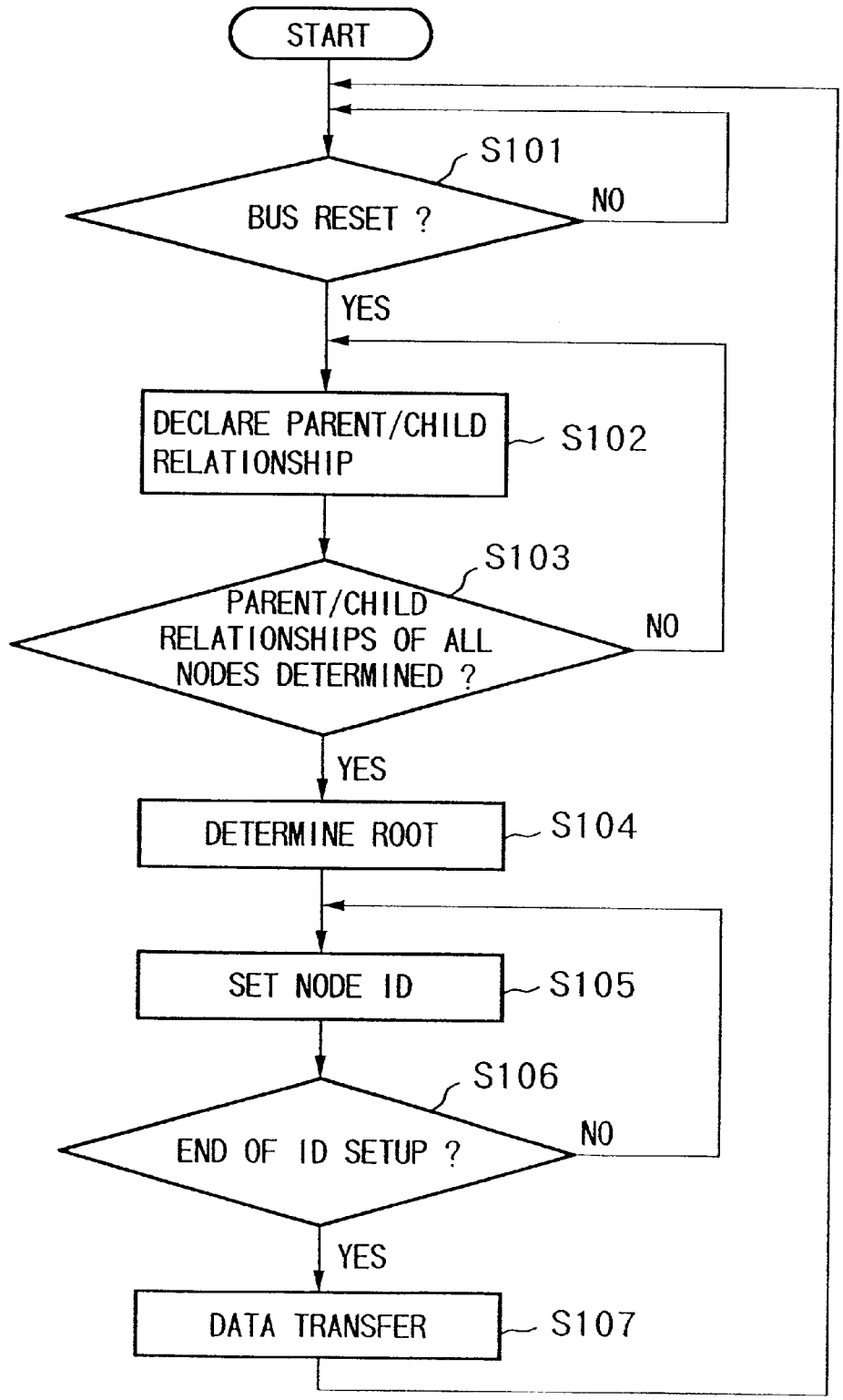
FIG. 17 is a flow chart showing the sequence from bus reset until data transfer is ready to start.

The flow chart in FIG. 17 shows a series of bus operations from generation of bus reset until data transfer is ready to restart after determination of the node IDs.

In step S101, the bus reset signal generated in the network is always monitored, and if it is determined in step S101 that the bus reset signal is generated due to, e.g., ON/OFF of the node power switch, the flow advances to step S102.

In step S102, directly connected nodes declare the parent/child relationship so as to recognize the new network connections from the reset state of the network. If it is determined in step S103 that the parent/child relationships are determined among all the nodes, a single root is determined in step S104. Before the parent/child relationships are determined among all the node, the parent/child relationship is repetitively declared in step S102, and no root is determined.

After the root is determined in step S104, node IDs are assigned to the individual nodes. The node IDs are set in a predetermined node order, and setting is repeated until IDs are assigned to all the nodes. If it is finally determined in step S106 that IDs are set for all the nodes, since a new network configuration has been recognized by all the nodes, data transfer between nodes is ready to restart in step S107, thus restarting data transfer.

In step S107, the control enters the mode for monitoring generation of the bus reset signal again, and upon detecting the bus reset signal, the control repeats the setting operations in steps S101 to S106.

Figure 18:
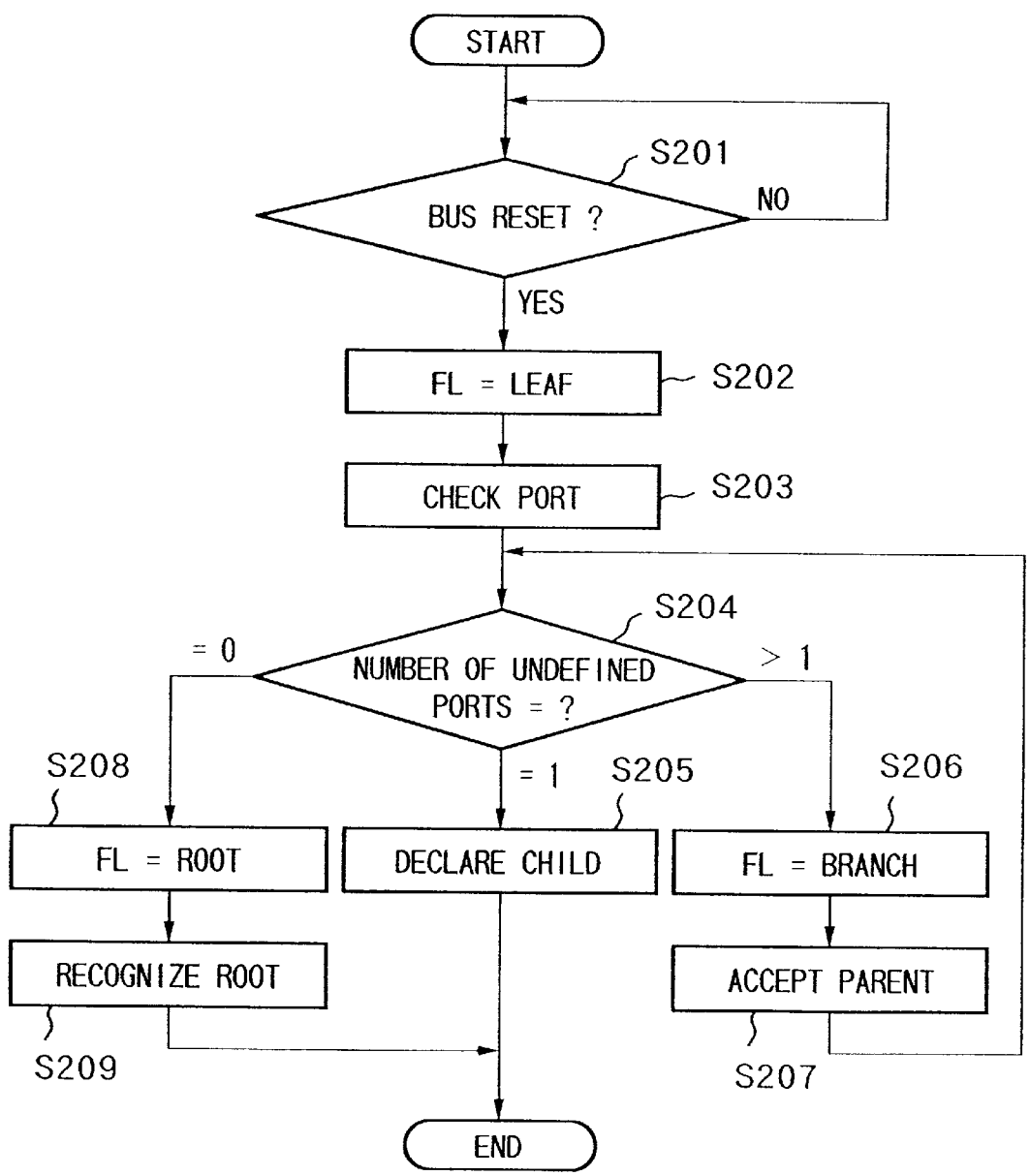
FIG. 18 is a detailed flow chart showing the sequence from bus reset until root determination.
Figure 19:
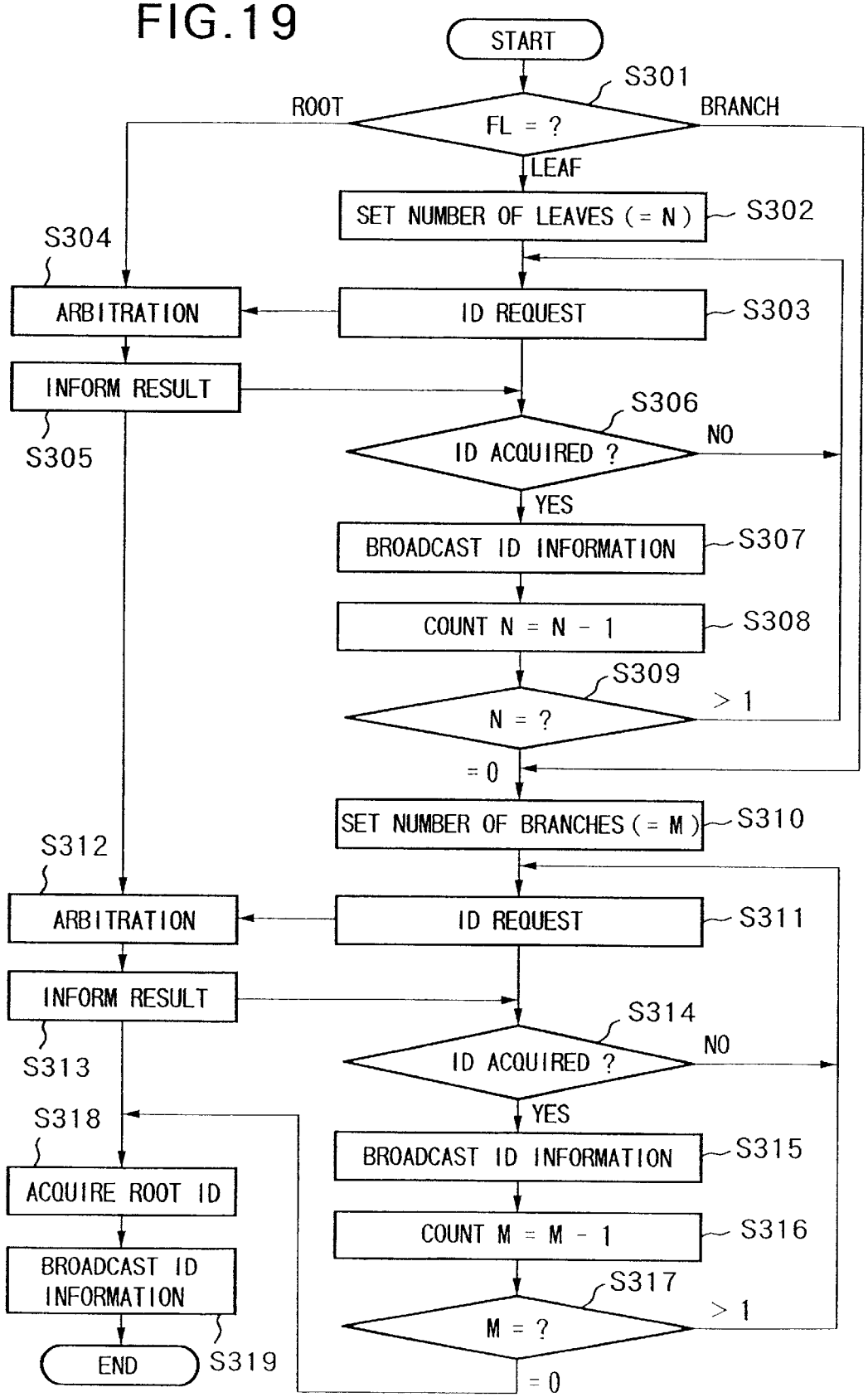
FIG. 19 is a flow chart showing the sequence from root determination until the end of ID setup.

The flow chart in FIG. 17 has been described. FIGS. 18 and 19 are flow charts respectively showing the sequence from bus reset until root determination, and the sequence after root determination until IDs are set in more detail, in the flow chart in FIG. 26.

The flow chart in FIG. 18 will be explained first.

If it is determined in step S201 that the bus reset signal is generated, the network configuration is temporarily reset. Note that generation of the bus reset signal is always monitored in step S201.

In step S202, as the first step of the operation for re-recognizing the connections of the reset network, a flag indicating a leaf (node) is set in each device. Furthermore, each device checks the number of nodes connected to its own port in step S203.

In accordance with the number of ports detected in step S204, the number of undefined ports (for which no parent/child relationship is determined yet) is checked. Immediately after bus reset, the number of ports=the number of undefined ports, but as the parent/child relationship is determined, the number of undefined ports detected in step S204 changes.

Immediately after bus reset, only a leaf can declare the parent/child relationship. Whether or not that node is a leaf can be recognized based on the number of ports detected in step S203. The leaf declares that "the node is a child, and the node connected is a parent" in step S205, thus ending the operation.

If the node recognizes that it has a plurality of ports and is a branch, since the number of undefined ports>1 is determined in step S204 immediately after bus reset, the flow advances to step S206 to set a flag indicating a branch, and that node waits until it accepts "parent" of the parent/child relationship declared by the leaf in step S207.

If the leaf has declared the parent/child relationship and the branch has accepted it in step S207, the branch checks the number of undefined ports in step S204, and if the number of undefined ports is 1, it declares that "the node is a child" in step S205 with respect to the node connected to the remaining port. After the second checking loop and the subsequent loops, if the number of undefined ports confirmed in step S204 is still 2 or more, the branch waits until it accepts "parent" from the leaf or another branch in step S207.

Finally, if the number of undefined ports of one branch or, exceptionally, a leaf (if it does not operate quickly although it can declare "child") becomes zero as a result of detection in step S204, it is determined that the parent/child relationships of the entire network have been declared, and a flag indicating a root is set in one and only node, the number of undefined ports of which has become zero (i.e., it is determined as the parent port of all other nodes), in step S208. In step S209, that node is recognized as a root.

In this way, the sequence from bus reset until declaration of the parent/child relationships among all the nodes in the network shown in FIG. 18 is completed.

The flow chart in FIG. 19 will be explained below.

In the sequence until FIG. 18, since the individual nodes have already been set with information of flags indicating leaves, branches, and root, the flow branches in step S301 based on the set flag.

In the operation for assigning IDs to the nodes, ID assignment can be started from each leaf. IDs are set from smaller numbers (from the node number=0) in the order of leaf→branch→root.

In step S302, the number N of leaves (N is a natural number) in the network is set. In step S303, each leaf requests the root ID assignment. If there are more than one assignment requests, the root performs arbitration in step S304, and assigns an ID number to one winning node and informs the losing nodes of the failure result in step S305. In step S306, the leaf that has failed to acquire an ID issues an ID request again to repeat the above operations. The leaf that has acquired an ID broadcasts the acquired ID information to all other nodes in step S307. Upon completion of broadcasting of the ID information from one node, the number of remaining leaves is decremented by 1 in step S308. If it is determined in step S309 that the number of remaining leaves is larger than 1, the above-mentioned processing is repeated from the ID request in step S303. After all the leaves have broadcasted their ID information, N=0 is determined in step S309, and the control starts ID setups of branches.

The ID setups of branches are done in the same manner as in the leaves.

In step S310, the number M of branches in the network (M is a natural number) is set. After that, each branch requests ID assignment of the root in step S311. The root performs arbitration (for determining one branch) in step S312, and assigns the smallest unassigned ID number next to those assigned to the leaves to one winning branch in step S312. In step S313, the root informs the branches that issued the requests of ID information or the failure result. In step S314, each branch that has failed to acquire an ID issues an ID request again to repeat the above operations. The branch that has acquired an ID broadcasts the acquired ID information to all other nodes in step S315. Upon completion of broadcasting of the ID information from one node, the number of remaining branches is decremented by 1 in step S316. If it is determined in step S317 that the number of remaining branches is larger than 1, the above processing is repeated from the ID request in step S311 until all the branches finally broadcast their ID information. After all the branches have acquired node IDs, M=0 is determined in step S317 thus ending the branch ID acquisition mode.

After the above-mentioned sequence, since the node that has not acquired ID information yet is only the root, the root sets the smallest unassigned number as its own ID number in step S318, and broadcasts the ID information of the root in step S319.

In this fashion, the sequence after determination of the parent/child relationships until ID setups in all the nodes is completed, as shown in FIG. 19.

An example of operations in an actual network will be described below with reference to FIG. 10.

Figure 10:
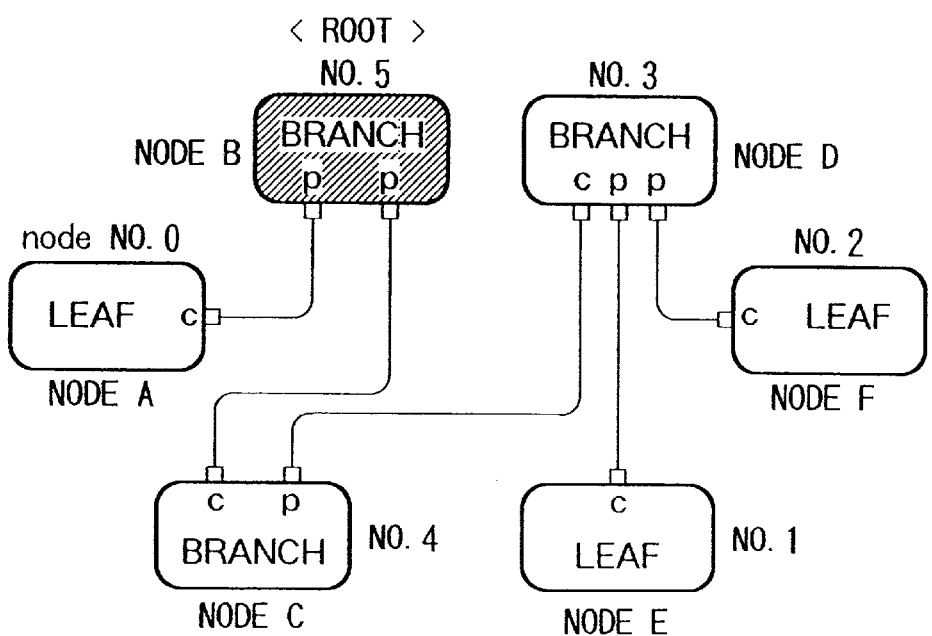
FIG. 10 is a diagram showing an example of the hierarchical structure of nodes.

Referring to FIG. 10, nodes A and C are directly connected to (root) node B as lower nodes, node D is directly connected to node C as a lower node, and nodes E and F are directly connected to node D as lower nodes, thus forming a layer structure. The layer structure and the sequence for determining the root node and node IDs will be explained below.

After the bus reset is done, the parent/child relationship is declared between the directly connected ports of the individual nodes. In the parent/child relationship, the parent is an upper node and the child is a lower node in the layer structure.

In FIG. 10, after the bus reset, node A declares the parent/child relationship initially. Basically, the parent/child relationship can be declared in the order from a node having a node connection at only one port (to be referred to as a leaf hereinafter). Since such node can detect first that it has only one port connection, the node recognizes that it is located at the end of the network, and the parent/child relationship is determined in the order from the node that has operated earliest. The port of the node which has declared the parent/child relationship (e.g., node A between nodes A and B) is set as a child, and the port of the node that has accepted the declaration (node B) is set as a parent. In this way, the child and parent are determined between nodes A and B, between nodes E and D, and between nodes F and D.

Ascending one layer, the nodes each having a plurality of connected ports (to be referred to as branches hereinafter) declare the parent/child relationships in turn from those that received the parent/child relationships declared by other nodes. In FIG. 10, after the parent/child relationships between nodes D and E and between nodes D and F are determined, node D declares the parent/child relationship with respect to node C, and as a result, the child and parent are determined between nodes D and C.

Node C that received the parent/child relationship declared by node D declares the parent/child relationship with respect to node B connected to the other node thereof. In this way, the child and parent are determined between nodes C and B.

As a result, the layer structure shown in FIG. 10 is formed, and node B which has become parent nodes at all the connected ports is finally determined to be a root node. One and only root node is present in one network configuration.

In FIG. 10, node B is determined to be a root node, but another node may be determined if node B that received the parent/child relationship declared by node A declares the parent/child relationship with respect to another node at earlier timing. More specifically, every node may become a root node depending on the transmission timings, and the root node is not always a specific node even in an identical network configuration.

After the root node is determined, the mode for determining node IDs is started. In this mode, all the nodes inform all other nodes of their own node IDs determined (broadcast function).

The own ID information includes the own node number, information of the connected position, the number of ports, the number of connected ports, the parent/child relationships of the individual ports, and the like.

The node ID number can be assigned from the nodes (leaves) each having only one connected port, and node numbers=0, 1, 2, . . . are assigned to these nodes in turn.

The node that has acquired a node ID broadcasts information including the node number to other nodes. With this broadcast, it is recognized that the ID number is "already assigned".

After all the leaves have acquired their own node IDs, node ID numbers following those of the leaves are assigned to branches. In the same manner as in the leaves, the branches that have been assigned node ID numbers broadcast their node ID information in turn in the assignment order, and finally, the root node broadcasts its own ID information. More specifically, the root always has a maximum node ID number.

In this way, node ID assignment for the entire layer structure ends, and the network architecture is reconfigured, thus completing initialization of the bus.

<Arbitration>

In the 1394 serial bus, the right of accessing the bus is arbitrated prior to data transfer. Since the 1394 serial bus is a logical bus-type network in which the connected devices individually relay the transferred signal to send an identical signal to all the devices in the network, arbitration is required to prevent packet collision. With this arbitration, only one node can transfer a signal at a certain timing.

Figure 11A:
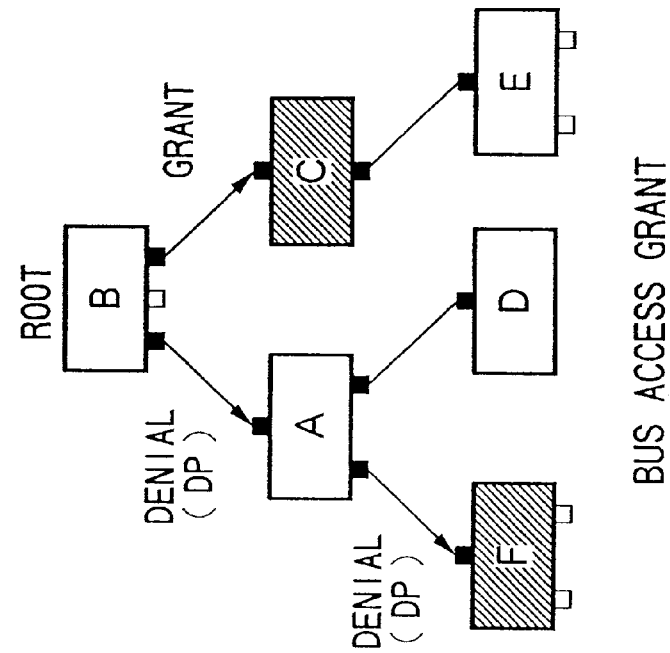
FIGS. 11A and 11B are diagrams for explaining bus arbitration.
Figure 11B:
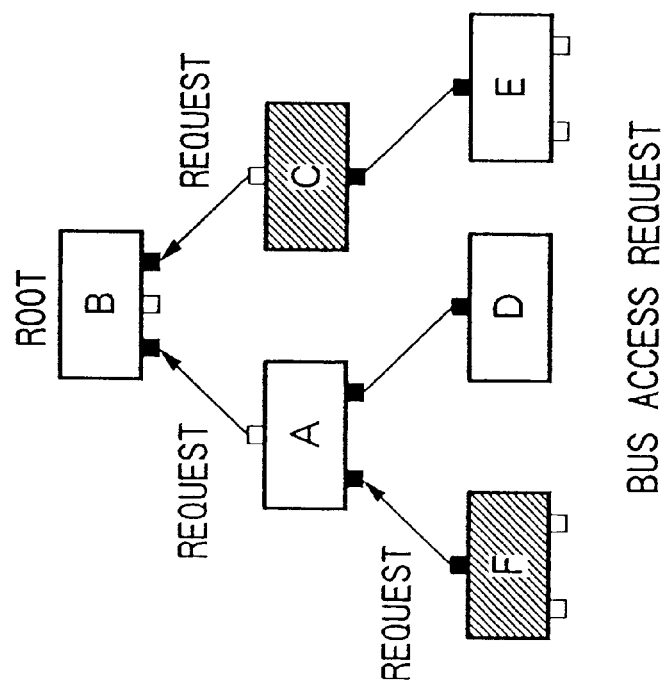

As the views for explaining arbitration, FIG. 11A shows bus access requests, and FIG. 11B shows a bus access grant. Arbitration will be explained below with reference to FIGS. 11A and 11B.

When arbitration is started, one or a plurality of nodes issue bus access requests to their parent node. In FIG. 11A, nodes C and F issue bus access requests. Upon receiving these requests, the parent node (node A in FIG. 11A) passes (relays) the bus access request to its parent node. This request is finally delivered to the root that performs arbitration.

Upon receiving the bus access request, the root node determines the node that is permitted to access the bus. This arbitration can be done by only the root node. The winning node in arbitration is granted bus access. In FIG. 11B, node C is granted bus access, and access by node F is denied. A DP (data prefix) packet is sent to the losing node in arbitration to inform it of denial. The bus access request of the denied node is queued until the next arbitration.

In this way, the node that wins the bus access grant in arbitration can subsequently start data transfer.

A series of operations in arbitration will be described below with reference to the flow chart in FIG. 20.

Each node can start data transfer only when the bus is idle. In order to recognize that the previous data transfer has ended and the bus is currently idle, each node determines that it can start data transfer if it detects an elapse of a predetermined idle time gap length (e.g., a subaction gap) set in each transfer mode.

In step S401, it is checked if a predetermined gap length according to the data to be transferred such as Async data, Iso data, and the like is obtained. Since the node cannot issue a bus access request required for starting transfer unless the predetermined gap length is obtained, it waits until the predetermined gap length is obtained.

If it is determined in step S401 that the predetermined gap length is obtained, it is checked in step S402 if the data to be transferred is present. If such data is present, the node issues a bus access request to the root to assure the bus so as to transfer the data. The bus access request signal is delivered finally to the root while being relayed by the devices in the network, as shown in FIG. 11A. If it is determined in step S402 that the data to be transferred is absent, the control waits for such data.

If in step S404 the root receives at least one bus access request issued in step S403, it checks the number of nodes that issued access requests in step S405. If the value selected in step S405 is the number of nodes=1 (i.e., only one node issued an access request), that node is granted bus access next. If the value selected in step S405 is the number of nodes>1 (a plurality of nodes issued access requests), the root performs arbitration for determining one node which is granted access in step S406. This arbitration is a fair one; the right of access is evenly assigned to the nodes that requested bus access without a specific node always gaining bus access in every arbitration.

In step S407, the flow branches depending on one node that is granted access as a result of arbitration of the root from a plurality of nodes that issued access requests, and losing nodes. In step S408, the root sends a grant signal to one node, which has gained access as a result of arbitration, or a node, which has gained access without arbitration since it is determined based on the value selected in step S405 that the number of nodes that issued access requests=1. Upon receiving the grant signal, the node starts transfer of the data (packet) to be transferred immediately after reception. On the other hand, in step S409 the root sends a DP (data prefix) packet indicating an arbitration failure to the nodes that have lost in the arbitration in step S406 and are denied bus access. Upon receiving such packet, the flow returns to step S401, and the node waits until the predetermined gap length is obtained, so as to issue a bus access request for transferring data again.

Figure 20:
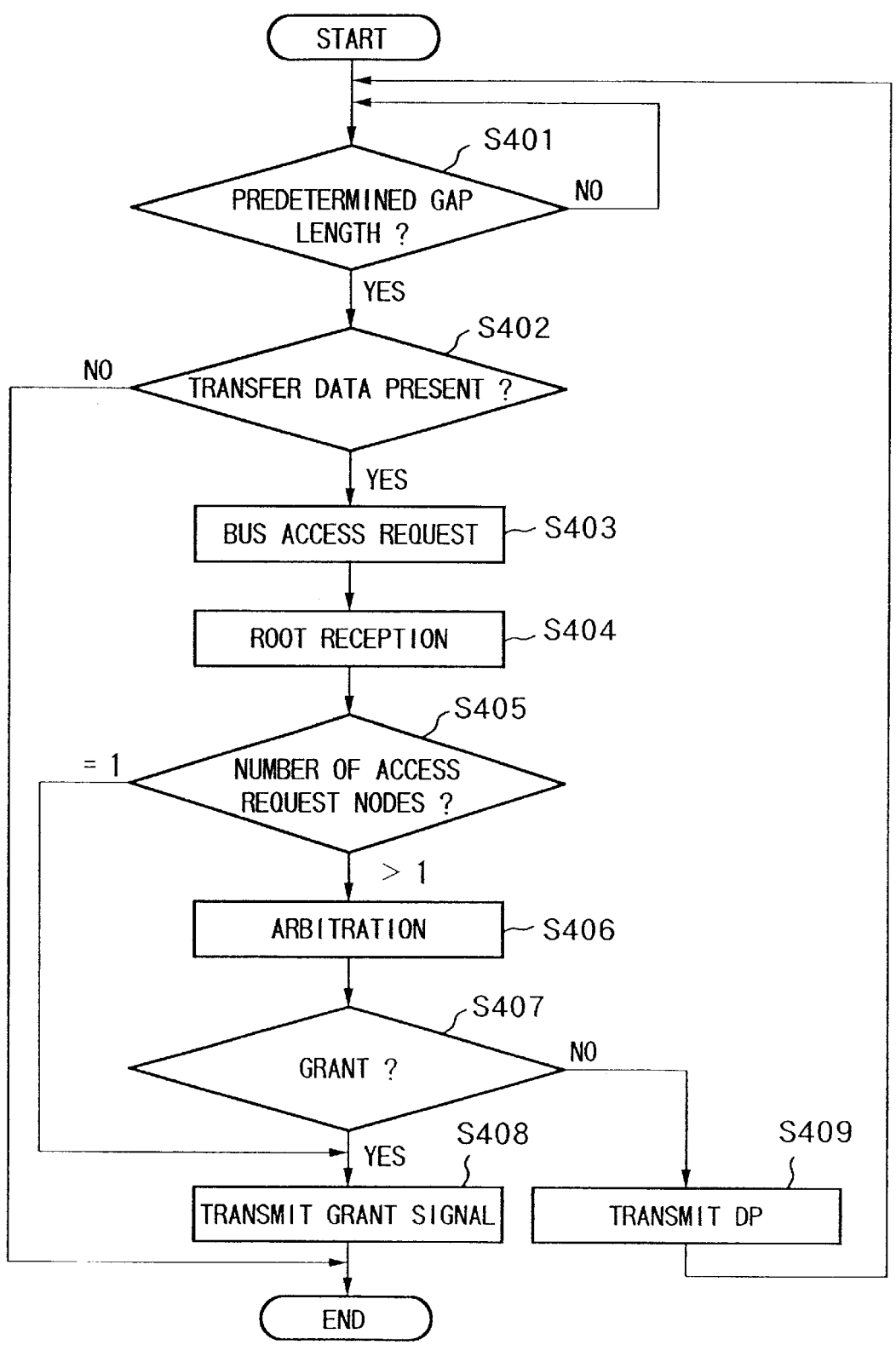
FIG. 20 is a flow chart showing the arbitration sequence.

The flow chart in FIG. 20 that explains the flow of arbitration has been described.

<Asynchronous Transfer>

Figure 12:
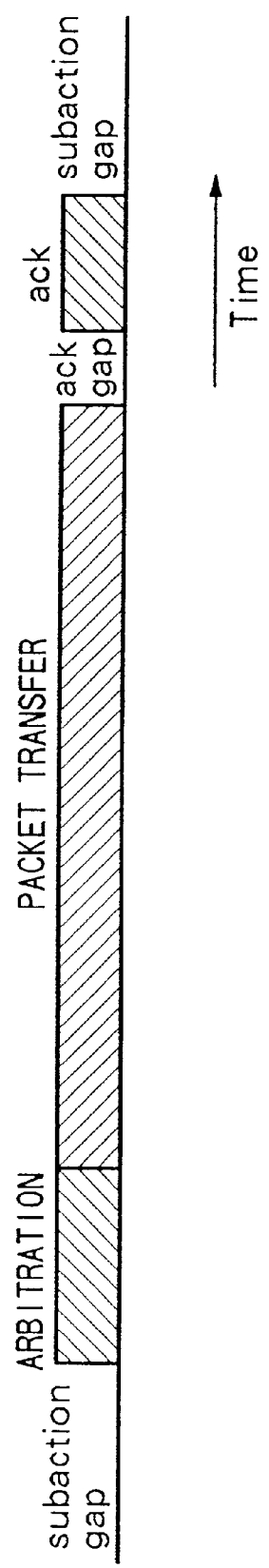
FIG. 12 is a chart showing progress of asynchronous transfer along with passage of time.

In asynchronous transfer, data are asynchronously transferred. FIG. 12 shows progress of asynchronous transfer along with passage of time. The first subaction gap in FIG. 12 indicates the idle state of the bus, and when this idle time reaches a predetermined value, the node that wants to transfer data determines that the bus can be used, and executes arbitration for gaining bus control.

When the node is permitted to access the bus as a result of arbitration, data transfer is done in the packet format. After the data transfer, the node that received the packet responds by sending back a reception result ack (reception acknowledgement send-back code) for the transferred data after a short gap called an ack gap or sends a response packet to complete transfer. The code ack consists of 4-bit information and 4-bit check sum and includes information indicating that data transfer is successful, busy, or pending. The code ack is immediately sent back to the source node.

Figure 13:
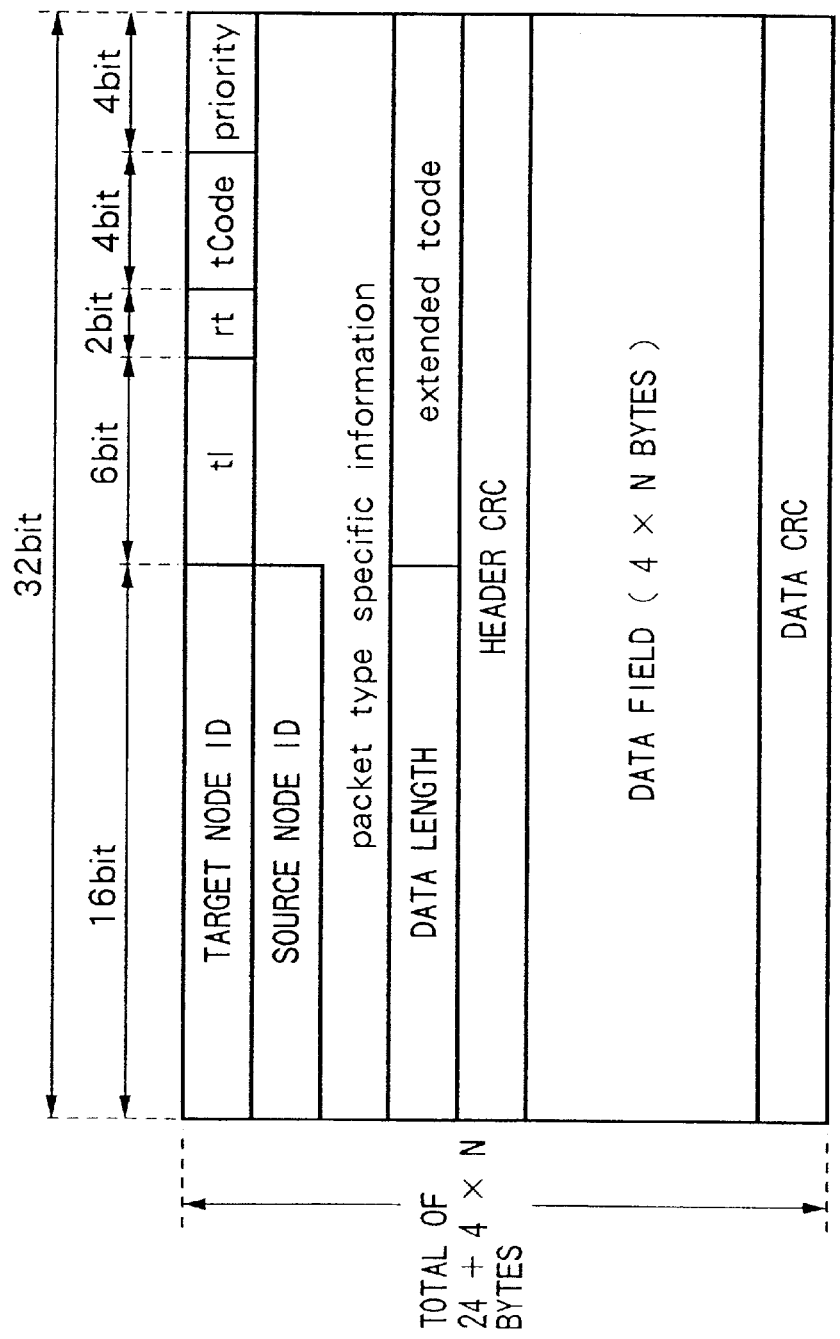
FIG. 13 shows an example of the packet format in asynchronous transfer.

FIG. 13 shows an example of the packet format in asynchronous transfer.

A packet has a header field in addition to a data field and error correction data CRC, and the header field is written with a destination node ID, source node ID, transfer data length, various codes, and the like to transfer the packet.

Asynchronous transfer is a one-to-one communication from the own node to the destination node. The packet transferred from the source node is transferred to all the nodes in the network, but each node ignores a packet with an address other than its own address, and only one destination node can read the packet.

Asynchronous transfer has been described.
<Isochronous Transfer>

In isochronous transfer, data are transferred isochronously. Isochronous transfer as the best feature of the 1394 serial bus is a transfer mode especially suitable for transferring data such as multimedia data (e.g., video data, audio data, and the like) that requires real-time transfer.

In contrast to asynchronous transfer as one-to-one transfer, isochronous transfer evenly transfers data from one node to all other nodes by the broadcast function (one-to-many).

Figure 14:
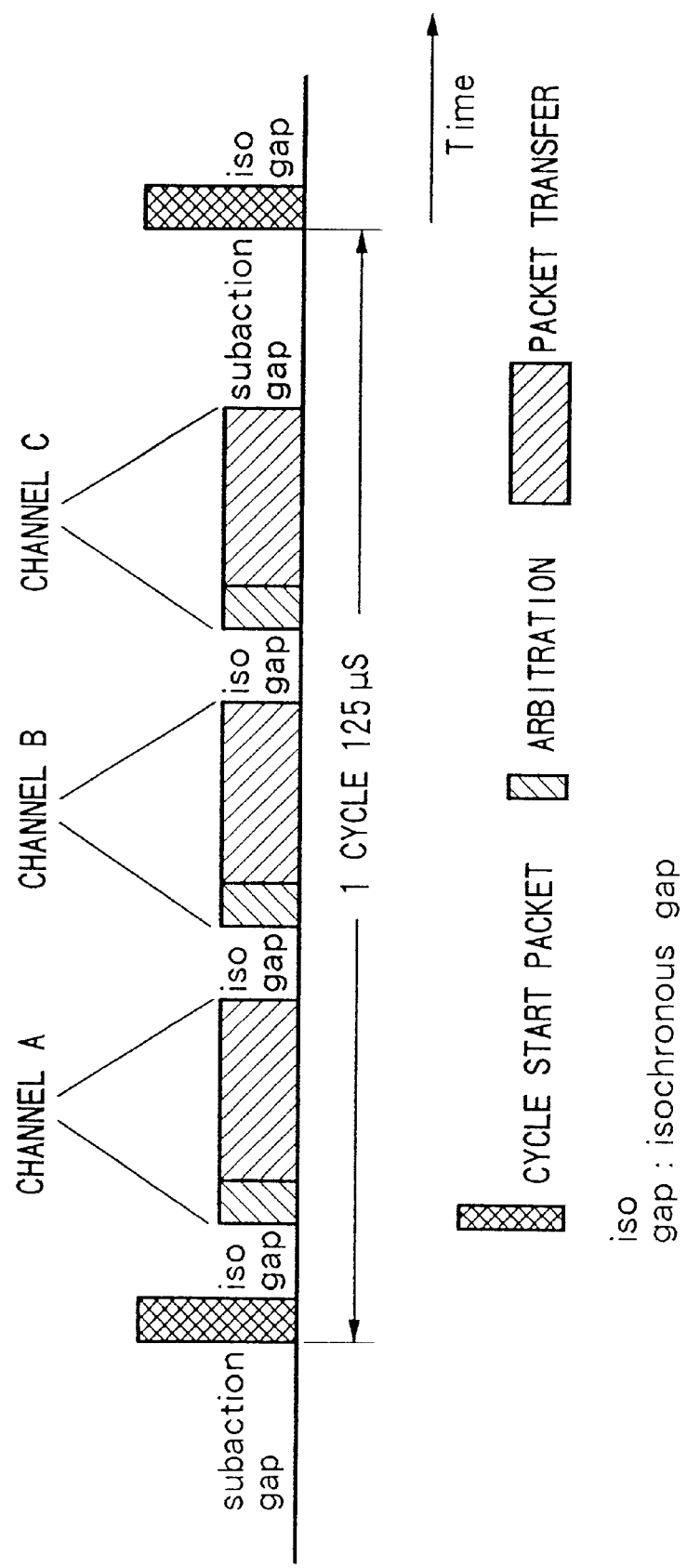
FIG. 14 is a chart showing progress of isochronous transfer along with passage of time.

FIG. 14 shows progress of isochronous transfer along with passage of time.

The isochronous transfer is executed at predetermined time intervals on the bus. This time interval is called an isochronous cycle. The isochronous cycle time is 125 μs. A cycle start packet indicates the start time of each cycle, and has a role of performing time adjustment of the individual nodes. A node called a cycle master transmits the cycle start packet. The cycle master transmits the cycle start packet indicating the start of the current cycle a predetermined idle period (subaction gap) after the completion of transfer in the previous cycle. The transmission time interval of adjacent cycle start packets is 125 μs.

As indicates by channels A, B, and C in FIG. 14, a plurality of different packets with different channel IDs can be separately transferred within one cycle. With this transfer, a plurality of nodes can attain real-time transfer at the same time, and the receiving node fetches only data with a desired channel ID. The channel ID does not represent any destination address but merely assigns a logical number to data. Hence, a certain packet is broadcasted from one source node to all other nodes.

Prior to packet transfer in the isochronous transfer mode, arbitration is made as in the asynchronous transfer mode. However, since the isochronous transfer mode is not a one-to-one communication mode unlike in the asynchronous transfer mode, no ack (reception acknowledgement send-back code) is present in the isochronous transfer mode.

An iso gap (isochronous gap) shown in FIG. 14 represents an idle period required for recognizing the idle state of the bus before the isochronous transfer. After an elapse of the predetermined idle period, the node which wants to start isochronous transfer determines that the bus is idle, and can perform arbitration before transfer.

Figure 15:
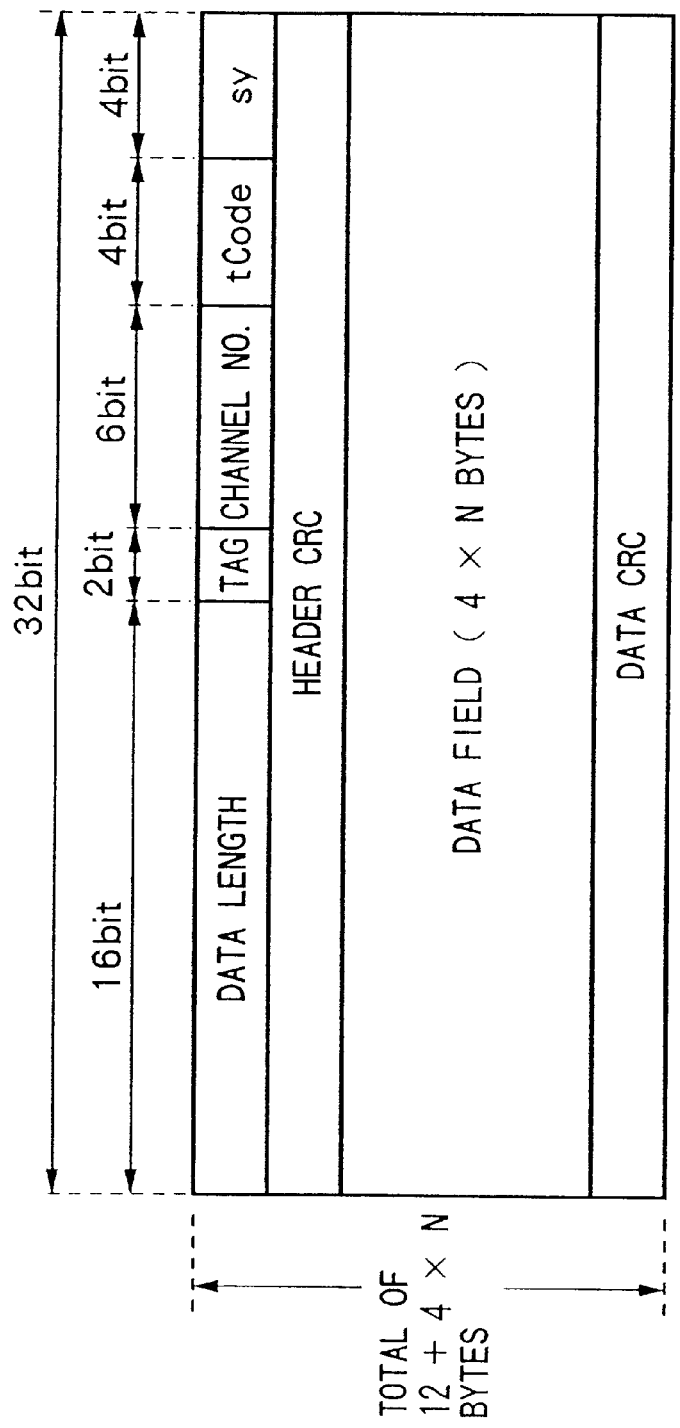
FIG. 15 shows an example of the packet format in isochronous transfer.

FIG. 15 shows an example of the packet format of isochronous transfer, and the format will be explained below.

Each of various types of packets assigned to the individual channels has a header field in addition to a data field and error correction data CRC. The header field is written with the transfer data length, channel No., various codes, error correction header CRC, and the like, so as to transfer the packet.

The isochronous transfer has been described.
<Bus Cycle>

Figure 16:
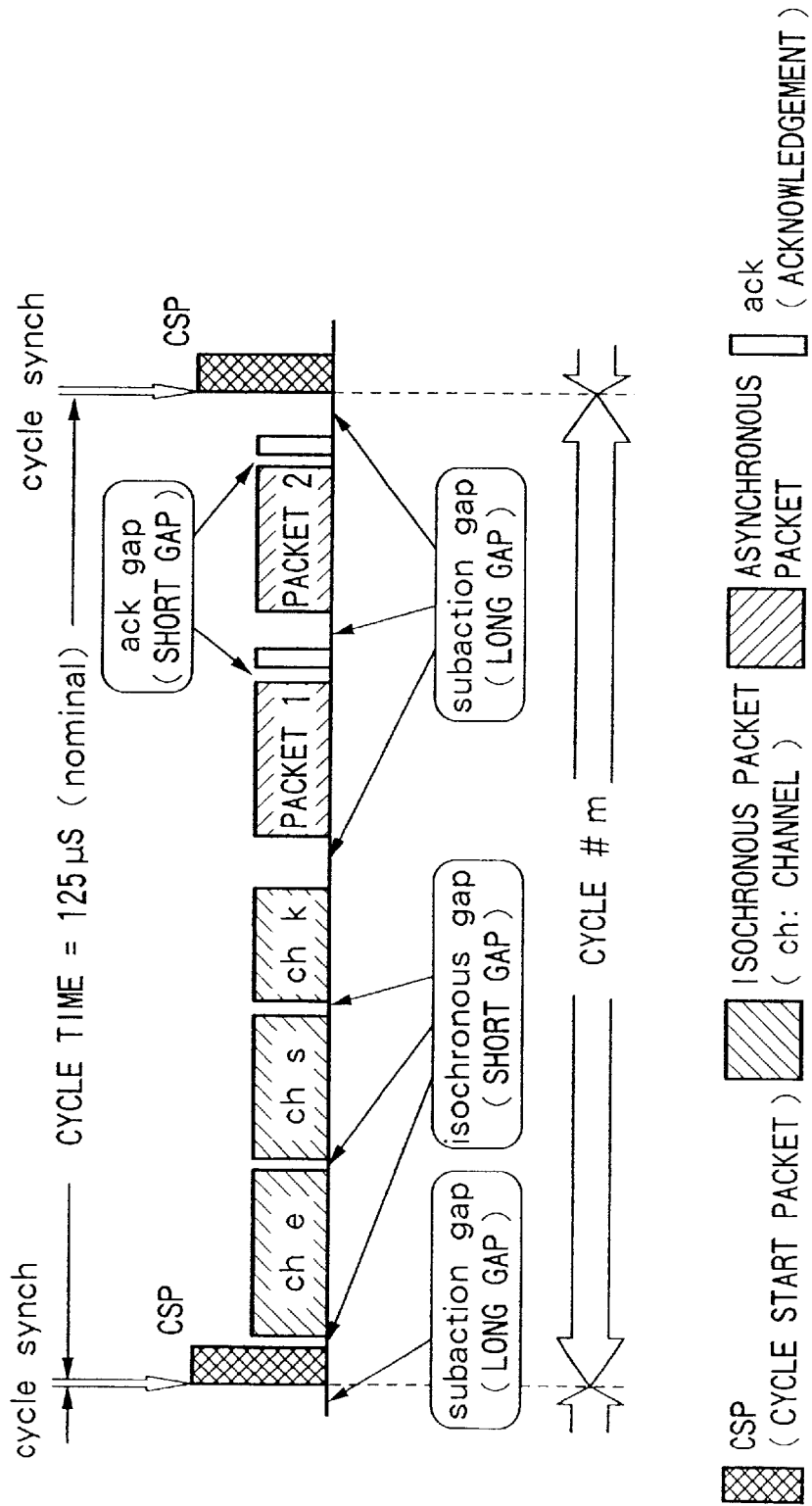
FIG. 16 is a chart showing progress of both isochronous transfer and asynchronous transfer on a bus along with passage of time.

In practical transfer on the 1304 serial bus, both the isochronous and asynchronous transfer modes can be simultaneously included in a single cycle. FIG. 16 shows progress of both isochronous transfer and asynchronous transfer on the bus along with passage of time.

The isochronous transfer mode is executed prior to the asynchronous transfer mode. This is because the isochronous transfer mode can be started by confirming a gap length (iso gap) shorter than the gap length (subaction gap) required for starting the asynchronous transfer mode. Hence, the isochronous transfer mode is executed prior to the asynchronous transfer mode.

In general bus cycles shown in FIG. 16, the cycle start packet is transferred from the cycle master to each individual node at the start timing of cycle #m. With this packet, the individual nodes perform time adjustment, and the node which is to perform isochronous transfer arbitrates after an elapse of a predetermined idle period (iso gap) so as to start packet transfer. In FIG. 16, channels e, s, and k are isochronously transferred in turn.

Upon completion of all the isochronous transfer channels in cycle #m after the operation from the arbitration to packet transfer is repeated in correspondence with the number of assigned channels, isochronous transfer is ready to start.

When the idle time has reached the subaction gap that allows the asynchronous transfer, the node which is to perform asynchronous transfer determines that it can execute arbitration.

Note that the asynchronous transfer can be performed during only a period wherein the subaction gap for starting asynchronous transfer can be assured from the end of the isochronous transfer until the time (cycle synch) at which the next cycle packet is to be transferred.

In cycle #m in FIG. 16, isochronous transfer for three channels and asynchronous transfer for two packets (packets 1 and 2; including ack) are done. After asynchronous packet 2, since the time (cycle synch) for starting cycle m+1 has been reached, transfer in cycle #m ends.

If the time (cycle synch) at which the next cycle start packet is to be transmitted has been reached during asynchronous or isochronous transfer, that transfer is not forcibly interrupted, and the next cycle start packet is transmitted an idle period after the end of that transfer. More specifically, when one cycle continues over 125 μs, the next cycle is shorter than the reference cycle time of 125 μs. In this manner, the isochronous cycle can be extended or shortened with reference to 125 μs.

However, the isochronous transfer is executed to maintain real-time transfer every cycle if necessary, and asynchronous transfer may be postponed to the next or subsequent cycle due to the shortened cycle time.
<Power Switching Control>

Figure 3:
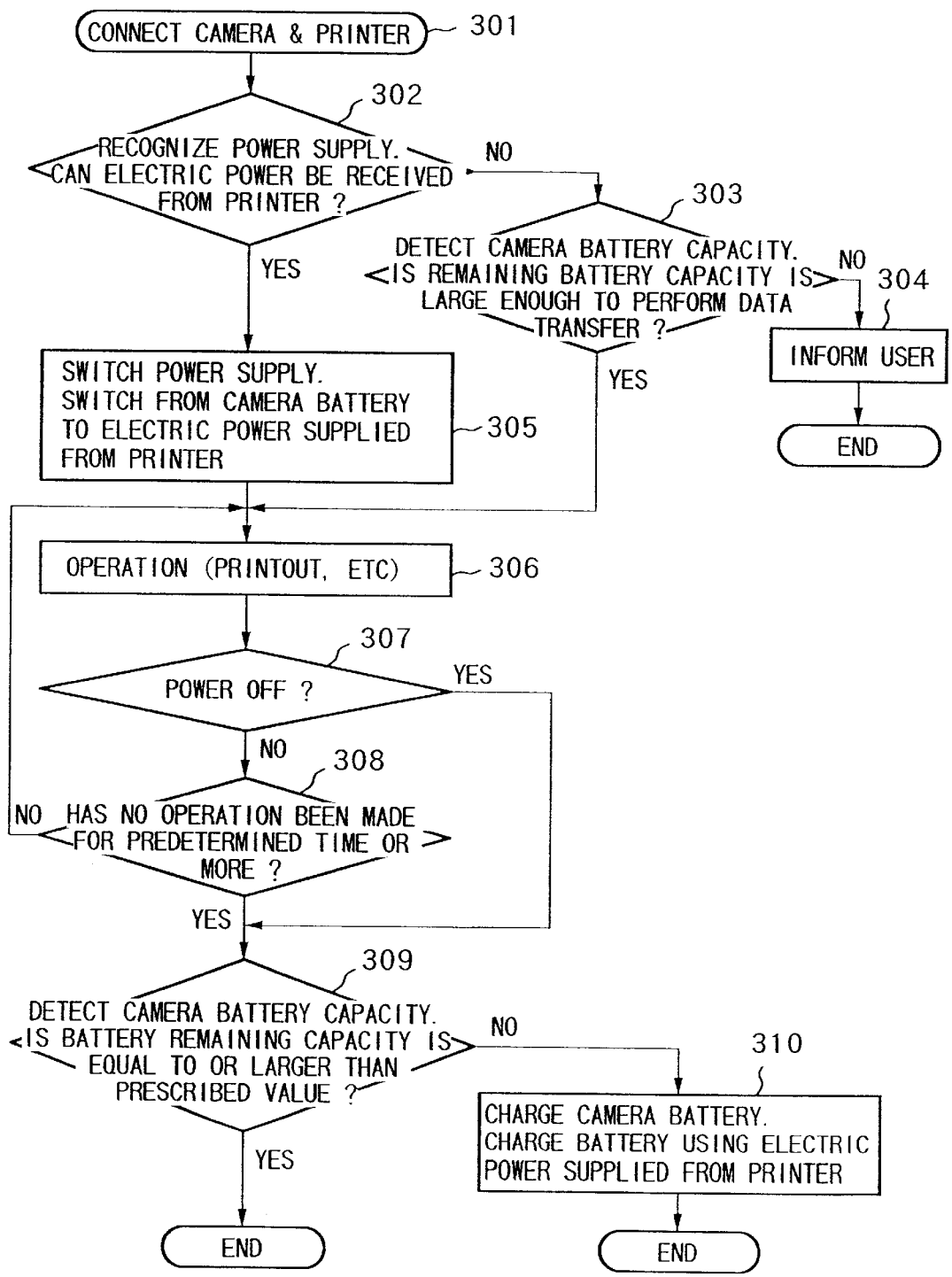
FIG. 3 is a flow chart showing the power supply control sequence in an image sensing device of the first embodiment when it is connected to a printer.

FIG. 3 is a flow chart showing the actual actions, operations, and processing of the digital image sensing device 117 controlled by the control unit 104 so as to allow better understanding of the above-mentioned actions of the device.

When the digital image sensing device 117 is directly connected to the printer 118 and the power switches of the digital image sensing device 117 and printer 118 are turned on, the digital image sensing device 117 checks if it can receive power supply from the connected cable (step 302). In this case, the control unit 104 in the digital image sensing device 117 transfers a recognition signal to the printer 118 via the data I/F unit 107, recognizes the printer 118 based on a response signal from the printer 118 with respect to the transferred signal, and checks based on the response signal if the printer 118 can supply power.

If it is determined that the printer 118 can supply power, the digital image sensing device 117 cuts off power supply from the internal battery 109 and supplies electric power supplied from the cable connected to the printer 118 to the image sensing device 117 by the switching control unit 201 (step 305). More specifically, the power supply source for operating the digital image sensing device 117 is switched from the internal battery 109 of the image sensing device to electric power supplied via the cable from the power management unit 119 in the printer 118.

In step 306, user's operations are done. For example, the user selects the image to be printed out, determines the output layout, sets the number of sheets to be output, performs processing such as color adjustment, index print, and the like, and prints out the selected image using the digital image sensing device 117 and printer 118.

Upon completion of operations, the user turns off the power switch to turn off the power supply. When the digital image sensing device 117 is directly connected to the printer 118, their power switches are interlocked by their power management units 108 and 119. When either of the power switch of the digital image sensing device 117 or that of the printer 118 is turned off, the power supplies of both the devices are turned off. Hence, in step 307, both the power supply states of the digital image sensing device 117 and printer 118 are checked.

When the user does not turn off the power switch, a timer 203 in the power management unit 108 starts from the operation end timing, and measures the non-operation time (idling time). When the idling time has reached a prescribed time (step 308—YES), the power detection unit 202 detects the remaining charge on the battery of the digital image sensing device 117 (step 309). If the remaining charge of the battery is larger than a prescribed value, the power supplies of the digital image sensing device 117 and printer 118 are turned off. However, if the remaining charge on the battery is smaller than the prescribed value, a battery charging mode is started, and the battery is charged by electric power supplied from the printer 118 (step 310).

On the other hand, if it is determined that the digital image sensing device 117 cannot receive power supply from the printer 118 via the connected cable (step 302—NO), electric power for the digital image sensing device 117 is supplied from the battery 109. In this case, the remaining capacity of the internal battery 109 of the digital image sensing device is detected in each operation or at a predetermined time interval (step 303). If it is detected that the remaining charge of electric power is not large enough to transfer image data, an alarm for the user is produced (step 304). This alarm may be displayed on the display 105 of the digital image sensing device 117 or a display (not shown) of the printer 118, or may be printed out onto an output medium of the printer 118. Furthermore, in order to prevent consumption of the battery 109, the digital image sensing device 117 inhibits the power management unit 108 from supplying any electric power to circuit blocks other than the power management unit 108 when no signals are exchanged with the printer 118.

When electric power cannot be received from the printer 118, steps 309 and 310 in FIG. 3 are skipped to inhibit remaining charge detection and charging of the battery 109 of the digital image sensing device 117.

When the printer is disconnected from the image sensing device, the power supply is reverted from electric power supplied from the printer 118 to the battery 109.

In the above-mentioned sequence, the digital image sensing device 117 and printer 118 are connected to each other, and the image sensing device 117 checks if it can receive electric power from the printer 118, and switches the power supply in accordance with the checking result. In this way, by only connecting the digital image sensing device 117 and printer 118, the digital image sensing device 117 can receive electric power from the printer 118. For this reason, battery consumption of the digital image sensing device 117 can be prevented, and the need for an AC power supply can be obviated.

Upon completion of data transfer to the printer 118, the digital image sensing device 117 may turn off its power supply to further reduce consumption power.

In this case, in place of turning off the entire power supply, power supply to blocks other than the power management unit 108 that controls the power supply upon receiving a signal from the printer 118 may be stopped.

In such case, when the printer 118 is disconnected, power supply from the battery 109 is restarted.

Second Embodiment

Figure 4:
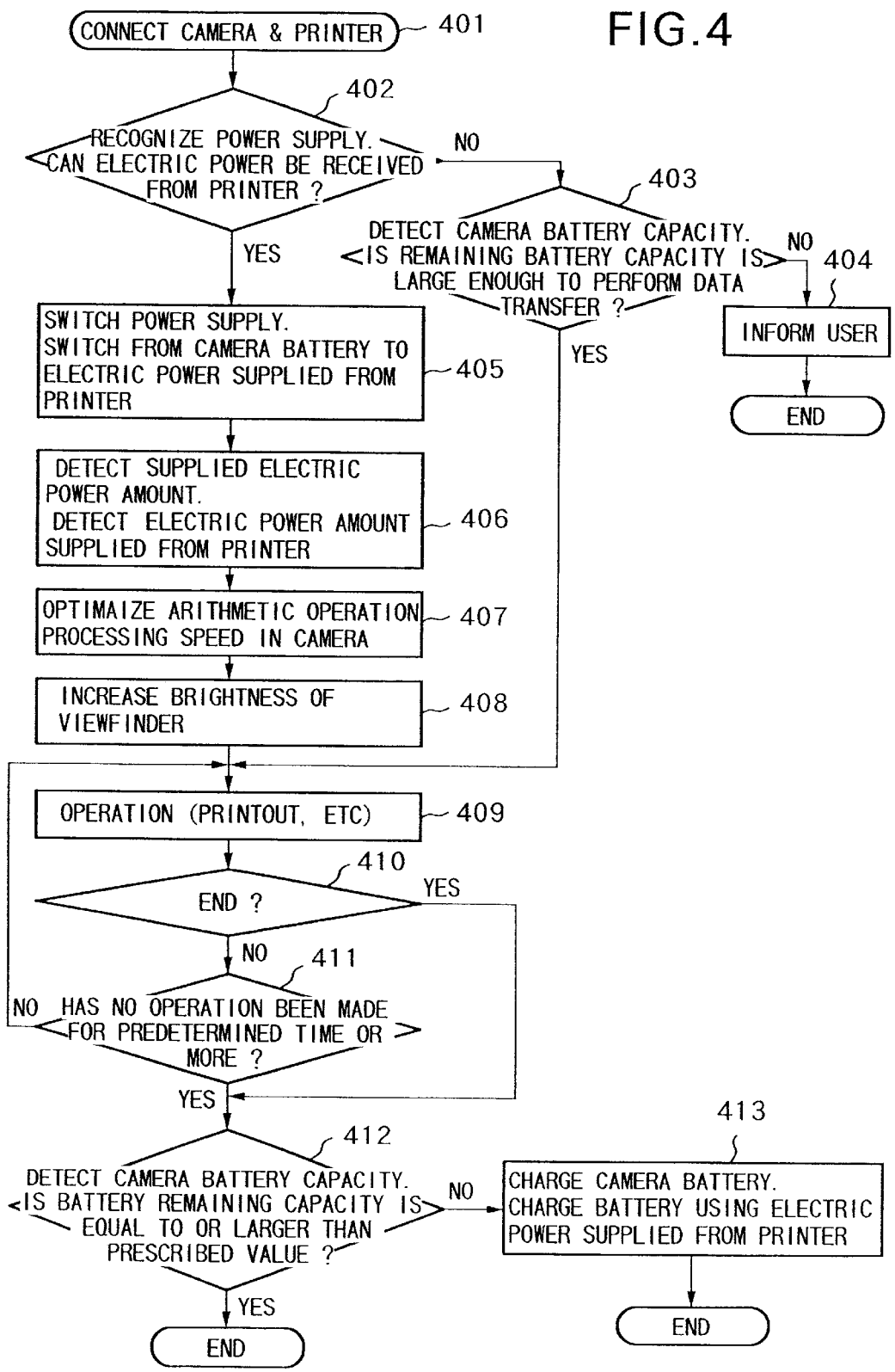
FIG. 4 is a flow chart showing the power supply control sequence in an image sensing device of the second embodiment when it is connected to a printer.

FIG. 4 shows the processing flow of the second embodiment. This embodiment will be briefly explained below with the aid of this flow chart. This embodiment will exemplify a case wherein a digital image sensing device and printer are directly connected to each other, and the digital image sensing device can receive electric power from the printer, as in the first embodiment. Note that the arrangement of the system of this embodiment is the same as that shown in FIGS. 1 and 2.

When the digital image sensing device 117 is directly connected to the printer 118 and the power switches of the digital image sensing device 117 and printer 118 are turned on, the digital image sensing device 117 checks if it can receive power supply from the connected cable (step 402). This checking is done in the same manner as in step 302 in FIG. 3.

If electric power can be received from the printer 118, the digital image sensing device 117 cuts off power supply from the internal battery 109 and operates its system by electric power supplied from the cable connected to the printer 118 (step 405).

The digital image sensing device 117, whose drive source is switched from the battery to electric power supplied from the printer 118, detect the electric power amount supplied from the printer 118 using the power detection unit 202 in the power management unit 108 (step 406). The detected electric power amount value is sent to the control unit 104 having a CPU (not shown). The control unit 104 determines an optimal operation frequency of the CPU that performs arithmetic operations and system control, on the basis of the detected electric power amount value. In general, a microprocessor requires more power as its operation frequency rises. For this reason, in a battery driving mode, the operation frequency is set to be lower than that in a driving mode using the power supply from the printer. As a result, the operation frequency of the CPU is changed to that determined by the control unit 104 (step 407).

Furthermore, the measured electric power amount value is supplied to the display control unit 106 to increase the brightness of the display 105 on the basis of that electric power amount value. As a result, the display contrast is increased and the visibility of the display 105 can be improved (step 408). For example, if the display 105 comprises a liquid crystal panel, the brightness of its backlight is increased when electric power is supplied from the printer 108.

If electric power cannot be received from the printer 108, if the remaining capacity of the battery 109 is equal to or lower than a predetermined value, the user is informed of such state by means of an alarm display on the display 105 of the digital image sensing device 117 or a printout from the printer 118. On the other hand, if the battery has a sufficiently large remaining capacity, the device is kept operated using the battery 109 as a power supply.

The operations after step 409 are substantially the same as those after step 307 in the first embodiment. However, in this embodiment, when the printer 118 is disconnected from the digital image sensing device 117, the digital image sensing device 117 reverts its power supply to the battery 109, drops the driving frequency of the CPU, and reduces the brightness of the display 105 to attain power savings.

As described above, one of two cables, i.e., a data transfer cable and power supply cable can be combined to a single cable, and the need for connection of the cable upon direct printing can be obviated. When the remaining charge on the battery of the digital image sensing device is small, the battery can be charged using electric power supplied from the printer. Also, functions limited due to problems associated with power consumption, e.g., the brightness of the screen of the display, the internal image processing operation speed of the digital image sensing device, and the like, can be improved.

When the remaining capacity of the battery becomes small in the battery driving mode, power supply to the display can be cut off to attain power savings.

As described above, according to the present invention, the need for connection of a power supply line to the digital image sensing device can be obviated, and battery consumption and short battery during data transfer can be prevented.

Other Embodiments

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image input/output system built by connecting an image output device and an image input device, said image output device outputting an image signal received from said image input device, and supplying electric power to said image input device, said image input device being connected to said image output device via a connection cable to transmit image data to said image output device and to receive the electric power supplied from said image output device, said image input device comprising:
a power supply unit; and
a power supply control unit (i) for determining whether to receive the electric power from said image output device, (ii) for, when it is determined that said image input device can receive the electric power from said image output device, using the electric power from said image output device, and (iii) for, when it is determined that said image input device cannot receive the electric power from said image output device, using electric power from said power supply unit,
wherein said image input device further comprises means for, when said image input device can receive the electric power from said image output device, measuring a supplied electric power amount, and optimizing an arithmetic operation speed of an image processing operation of said image input device in accordance with the obtained electric power value.

2. An image input device comprising:
connection means connected to an external device which exchanges data with a connected device, and can supply electric power to said image input device;
a power supply unit;
a power supply control unit (i) for checking if electric power can be received from said external device, (ii) for, when it is determined that the electric power can be received from said external device, using the electric power from said external device, and (iii) for, when it is determined that the electric power cannot be received from said external device, using electric power from said power supply unit; and
means for, when the electric power can be received from said external device, measuring a supplied electric power amount, and optimizing an arithmetic operation speed of an image processing operation of said image input device in accordance with the obtained electric power value.

3. A method of controlling an image input device, which has a power supply unit and a display unit, is connected to an external device, and is driven by electric power supplied from one of the external device and the power supply unit, comprising:

a determination step of checking if electric power can be received from the external device;

a power supply control step of using the electric power from the external device when it is determined that the electric power can be received from the external device, and using electric power from the power supply unit when it is determined that the electric power cannot be received from the external device; and a measuring step of measuring a supplied electric power amount when it is determined in said determination step that the electric power can be received from the external device, and optimizing an arithmetic operation speed of an image processing operation of the image input device in accordance with the obtained electric power value.

4. The system according to claim 1, wherein said power supply control unit comprises determination means for determining whether or not electric power capacity required for driving said image input device can be supplied from said image output device, and wherein said power supply control unit cuts off electric power from said power supply unit and supplies electric power from said image output device when it is determined that electric power capacity required for driving said image input device can be supplied from said image output device.

5. The system according to claim 1, wherein said power supply unit comprises a rechargeable battery and said image input device further comprises means for determining if no operation input has been made for at least a predetermined period of time, and when it is determined that no operation input has been made for at least the predetermined period of time, said power supply control unit recharges said battery.

6. The system according to claim 1, wherein said power supply unit comprises a rechargeable battery and, when it is determined that said image input device cannot receive the electric power from said image output device, said power supply control unit detects a remaining charge on said battery, and when the remaining charge on said battery is not more than a predetermined value, said power supply control unit outputs a message indicating an insufficient remaining charge.

7. The system according to claim 1, wherein said image input device and said image output device are connected by an interface complying with IEEE 1394 standard.

8. The system according to claim 1, wherein a digital camera is used as said image input device and a printer is used as said image output device.

9. The device according to claim 2, wherein said power supply control unit comprises determination means for determining whether or not electric power capacity required for driving said image input device can be supplied from said external device, and wherein said power supply control unit cuts off electric power from said power supply unit and supplies electric power from said external device when it is determined that electric power capacity required for driving said image input device can be supplied from said external device.

10. The device according to claim 2, further comprising a rechargeable battery in said power supply unit and means for determining if no operation input has been made for at least a predetermined period of time, wherein when it is determined that no operation input has been made for at least the predetermined period of time, said power supply control unit recharges said battery.

11. The device according to claim 2, wherein said power supply unit comprises a rechargeable battery, and when it is determined that said image input apparatus cannot receive the electric power from said external device, said power supply control unit detects a remaining charge on said battery, and when the remaining charge on said battery is not more than a predetermined value, said power supply control unit outputs a message indicating an insufficient remaining charge.

12. The device according to claim 2, wherein said image input device and said external device are connected by an interface complying with IEEE 1394 standard.

13. The device according to claim 2, wherein a digital camera is used as said image input device and a printer is used as said external device.

14. The method according to claim 3, further comprising a determination step of determining whether or not electric power capacity required for driving the image input device can be supplied from the external device, and wherein electric power from the power supply unit is cut off and electric power from the external device is supplied in said power supply control step, when it is determined that electric power capacity required for driving the image input device can be supplied from said external device.

15. The method according to claim 3, further comprising a step of determining if no operation input has been made for at least a predetermined period of time, and a step of recharging a battery used in the power supply unit, wherein when it is determined in said determining step that no operation input has been made for at least the predetermined period of time, the battery is recharged in said recharging step.

16. The method according to claim 3, wherein the power supply unit comprises a battery, and when it is determined that the image input device cannot receive electric power from the external device, a remaining charge on the battery is detected in said power supply control step, and when the remaining charge on the battery is not more than a predetermined value, said method further comprises a step of outputting a message indicating an insufficient remaining charge.

17. The method according to claim 3, wherein the image input device and the external device are connected by an interface complying with IEEE 1394 standard.

18. The method according to claim 3, wherein a digital camera is used as the image input device and a printer is used as the external device.

* * * * *

UNITED STATES PATENT AND TRADEMARK OFFICE
CERTIFICATE OF CORRECTION

PATENT NO.    : 6,580,460 B1
DATED         : June 17, 2003
INVENTOR(S)   : Kenji Takahashi et al.

It is certified that error appears in the above-identified patent and that said Letters Patent is hereby corrected as shown below:

Drawings,
Sheet 3, FIGURE 3, "CAPACITY IS" (both occurrences) should read -- CAPACITY --.
Sheet 4, FIGURE 4, "CAPACITY IS" (both occurrences) should read -- CAPACITY --.

Column 6,
Line 38, "node," should read -- nodes, --.

Column 7,
Line 34, "only" should read -- only one --.

Column 9,
Line 9, "only" should read -- only one --.

Column 11,
Line 47, "indicates" should read -- indicated --.

Signed and Sealed this

Eighteenth Day of November, 2003

JAMES E. ROGAN
*Director of the United States Patent and Trademark Office*